Patented Mar. 25, 1941

2,236,099

UNITED STATES PATENT OFFICE 2,236,099

TREATMENT OF PARAFFIN HYDROCARBONS

Vladimir N. Ipatieff and Herman Pines, Chicago, Ill., assignors to Universal Oil Products Company, Chicago, Ill., a corporation of Delaware No Drawing. Application April 17, 1939, Serial No. 268,346

15 Claims. (Cl. 196—10)

This application is a continuation-in-part of my application Serial No. 35,237, filed August 8, 1935.

This invention relates particularly to the treatment of paraffinic hydrocarbons and more particularly the butanes which are normally gaseous though in its broadest aspect it includes the treatment of ordinary liquid paraffin hydrocarbons.

In a specific sense the invention is concerned with a process for alkylating 4 carbon atom butanes with olefins which are normally gaseous to produce saturated hydrocarbons of higher molecular weight which can be utilized as constituents of motor fuel for automobile and aeroplane engines.

There is a very large production of fixed gases in connection with the production and refining of petroleum. Large amounts of butanes occur in natural gas and well or casinghead gases and further quantities as well as normal and isobutenes and propene are produced incidental to the cracking of the heavier portions of petroleums with the principal object of producing gasoline. Petroleum gases are as a rule utilized only as a fuel and from the standpoint of the oil refiner who is preliminarily concerned with the manufacture of gasoline and lubricating oils these gases are mainly considered as waste material, so that considerable experimentation has been conducted to find methods for converting them into liquid products with practical efficiency.

The utilization of these gaseous materials has been attempted by employing straight thermal treatment without catalysts, which methods involve ordinarily relatively higher temperatures and pressures than those employed in oil cracking operations and by catalytic processes which as a rule operate under less severe conditions. In one of its aspects the present process is a development of and an improvement in the latter type of process.

In one specific embodiment the present invention comprises the alkylation of iso-paraffins or mixtures of iso and normal paraffins with normally gaseous olefin hydrocarbons at temperatures within the approximate range of —50 to 400° C. in the presence of catalysts comprising generally metal halides and hydrogen halides which are suitable for accelerating alkylation reactions.

The essential feature of the present invention is the utilization of properly chosen conditions of operation with respect to temperature, pressure, concentration of reactants and time of contact so that the ordinarily vigorous action of the general class of salts mentioned in catalyzing polymerization reactions among olefinic hydrocarbons is moderated so that reactions of alkylation occur rather than simple polymerization of the olefins involved. In other words, selected conditions are employed at which the rate of the polymerization reactions is kept at a practical minimum while the rate of the alkylation reactions is maintained at a relatively high level so that alkylation of paraffins takes place in preference to simple polymerization of the olefins involved. As a further feature of the invention the process is so conducted that a considerable molal excess of paraffin is always present in proportion to the olefins and alkylation reactions are further fostered in preference to polymerization.

An extensive series of experiments has indicated that normal paraffins are not capable of being directly alkylated with olefins and that iso-paraffins react readily. The process is therefore most readily applicable to iso-paraffins such as iso-butane or other corresponding branched chain hydrocarbons of higher molecular weight and normally liquid characteristics. In so far as isomerization reactions may take place during the treatment of normal paraffins with olefins in the presence of the preferred catalyst, alkylation has been found to occur. This tendency may be further favored in the alkylation of mixtures of iso and normal paraffins in which case the excess energy of the reaction involved in the alkylation of iso-paraffins influences the activity of normal paraffins in the mixture so that a certain degree of alkylation takes place probably through the primary step of isomerization, although this mechanism is difficult to demonstrate exactly by experiment.

The present invention contemplates the alternative use of a considerable number of metal halide-hydrogen halide combinations for assisting in bringing about the desired alkylation reactions. There is no exact equivalency in the action of these composites, and the use of any particular one or any combination will require particular combinations of temperature, time of contact and details of operation both during the reaction period and in the subsequent separation and fractionation of the products.

Among the metal halides which may be employed to accelerate the alkylation reactions may be mentioned aluminum chloride, zinc chloride, ferric chloride, and stannic chloride, each one of which will require specially selected temperature conditions and details of procedure depending upon their physical properties and their effect upon a particular alkylation reaction. Aluminum chloride and ferric chloride are commonly best utilizable in a substantially anhydrous condition and in conjunction with a smaller quantity of hydrogen chloride. Zinc chloride and stannic chloride may be employed either in the substantially anhydrous state or in solutions of such concentration that they are sufficiently fluid at the temperature of use. These solid salts may be employed on relatively inert and granular carrying materials to assist in their dissemination throughout a reacting mixture and assist in increasing the intimacy of contact.

The process of the invention is particularly applicable to the alkylation of iso-butane with the normally gaseous olefins and particularly with the butenes and propene although ethene can also be employed under suitably modified conditions. These alkylation reactions are of particular importance in the oil industry in connection with the cracking process, the fixed gases which ordinarily contain large quantities of 3 and 4 carbon atom hydrocarbons both olefinic and saturated. Processes are at the present time in commercial operation which either thermally or catalytically polymerize the 3 and 4 carbon atom olefins to form liquid products suitable as hydrocarbon motor fuel but in both types of processes the paraffinic hydrocarbons in the selected fractions or mixtures are substantially unaffected so that the gasoline-forming potentialities of the gases are not completely utilized. By means of the present process the olefins may be caused to combine to a large extent with the butanes present in such gases to produce gasoline boiling range liquids of a saturated but still of a high antiknock character so that the ultimate yield of light hydrocarbon liquids from cracked gas mixtures such as stabilizer refluxes is considerably increased.

The principles of the present invention also find application in the alkylation of paraffin hydrocarbons or their mixtures which are normally liquid. The broad temperature range mentioned as utilizable with various combinations of hydrocarbons and various catalysts covers practically all those which are necessary for the present type of reactions. Owing to the extensive possibilities in combinations of different olefins and different paraffins which might be employed in the reactions the total range of operating conditions which the invention comprises is somewhat difficult to state. Pressures may be employed when necessary to prevent undue losses of materials by vaporization and maintain the hydrocarbons undergoing reaction substantially in liquid phase. In general aluminum chloride is the most active of the catalytic materials proposed and in its use the lower temperatures within the range mentioned, for example, −50 to 60° C., may be employed and fewer precautions taken for maintaining an excess of paraffin at all times. Zinc and ferric chloride will require more elevated temperatures of the order of 100–200° C. with concurrently superimposed pressures to increase the concentration of the reactants while higher relative proportions of paraffins must be maintained to insure a minimum of polymerization reactions among the olefins. Stannic chloride is in most instances the least reactive of the group of catalysts mentioned and will require still higher temperatures usually above 200° C.

The actual operation of the process admits of some modification depending upon the normal phase of the reacting constituents and whether batch or continuous operations are employed. In a simple type of low temperature batch operation a paraffin to be alkylated, such as, for example iso-butane is maintained at a suitably chosen temperature, usually below 20° C. when aluminum chloride is used as a catalyst, and its alykylation is effected by the gradual introduction of an olefin, such as, for example, isobutene under the surface of the liquid which may be mechanically stirred to effect intimate contact between catalyst and reacting compounds and prevent subsidence of sludges which are heavier than the liquid menstruum. In another method of operation the cooled and liquid paraffin may be mixed with a liquid olefin at a suitably chosen temperature, a suitable catalyst added and the reactions of alkylation induced by a sufficiently long contact with the catalyst chosen. Alkylation may be allowed to progress to different stages of replacement. In the case of the alkylation of butanes with propene or the butenes, the best products from the standpoint of motor fuel usually are produced by the condensation of equimolecular quantities. After a batch treatment is completed the partially spent catalyst is allowed to settle, and the upper hydrocarbon layer is removed by decantation and subjected to fractionation for the removal of uncombined hydrocarbons as a light overhead and the recovery of an intermediate motor fuel fraction.

In continuous operation a liquid paraffin containing suspended therein the requisite amount of catalyst and maintained at a proper temperature may be pumped through a tubular treater, the desired alkylation reactions taking place during passage through the treater and the fractionation of the product accomplished in succeeding fractionating equipment. The details of continuous processes of this general character are more or less familiar to those skilled in oil refinery operations and any necessary additions to or modifications of the above general procedures will be more or less obvious, and can be made without departing from the general scope of the invention.

While the present process possesses particular advantages in connection with the utilization of the gases produced in oil cracking plants, it has a broader significance and includes generally the interaction of any olefin and any reactive paraffin or mixture thereof at temperatures at which alkylation reactions are fostered by the preferred catalysts in preference to the simple polymerization of the olefins.

The following examples are given as illustrative of the type of results normally obtainable by the use of the present process, although it is not given with the intention of limiting the generally broad scope of the invention.

*Example I*

50 parts by weight of iso-butane were alkylated by 62 parts of iso-butene. The paraffin was cooled to a temperature of −30° C. and 20 parts by weight of finely divided anhydrous aluminum chloride was maintained in suspension by mechanical stirring devices. During the stirring a partially cooled stream of iso-butene was introduced along with a small quantity of hydrogen chloride. After the reaction there was a lower layer of aluminum chloride plus certain addition complexes which amounted to 30 parts by weight while the upper layer consisted of 100 parts by weight of a hydrocarbon product which was entirely paraffinic as indicated by its complete stability toward potassium permanganate solutions and nitrating mixture. This layer was water-white and 80% of it boiled below 400° F. The octane number according to the CFR motor method was 85.

*Example II*

To illustrate the direct application of the process in the improvement in antiknock value of a gasoline, a stabilizer reflux was passed into a paraffinic gasoline at a temperature of −20° C. in which was suspended about 5% by weight of anhydrous aluminum chloride, the necessary trace of hydrogen chloride being added to the gas mixture. The stabilizer reflux consisted of approximately 15% by volume of 4 carbon atom olefins and 25% of 4 carbon atom paraffins. After the passage of about 2000 cubic feet of stabilizer reflux (calculated on a gas basis) per barrel of gasoline and the subsequent stabilization of the gasoline to a 10 pound vapor pressure it was found that the gasoline had increased in weight by about 30% and that the octane number had been increased from an original value of 40 to 65 by the motor method. The observed increase in octane number was due principally to the alkylation of iso-butane with iso-butene.

The foregoing specification has disclosed the character and scope of the present invention and the examples have shown its practical aspects, but neither section is to be considered as unduly limiting.

We claim as our invention:

1. A process for synthesizing hydrocarbons which comprises alkylating a paraffin with a normally gaseous olefin at a temperature within the range of −50 to +60° C. in the presence of aluminum chloride and hydrogen chloride.

2. A process for synthesizing hydrocarbons which comprises alkylating an iso-paraffin with a normally gaseous olefin at a temperature within the range of −50 to +60° C. in the presence of aluminum chloride and hydrogen chloride.

3. A process for producing hydrocarbons boiling in the gasoline range which comprises alkylating iso-butane with a normally gaseous olefin at a temperature within the range of −50 to +60° C. in the presence of aluminum chloride and hydrogen chloride.

4. A process for synthesizing hydrocarbons which comprises alkylating a paraffin with an olefin at a temperature within the range of 100–200° C. in the presence of zinc chloride and hydrogen chloride.

5. A process for synthesizing hydrocarbons which comprises alkylating an iso-paraffin with an olefin at a temperature within the range of 100 to 200° C. in the presence of zinc chloride and hydrogen chloride.

6. A process for synthesizing hydrocarbons which comprises alkylating a paraffin with an olefin at a temperature within the range of 100 to 200° C. in the presence of ferric chloride and hydrogen chloride.

7. A process for synthesizing hydrocarbons which comprises alkylating an iso-paraffin with an olefin at a temperature within the range of 100 to 200° C. in the presence of ferric chloride and hydrogen chloride.

8. A process for synthesizing hydrocarbons which comprises alkylating a paraffin with an olefin in the presence of a metal halide catalyst and a hydrogen halide.

9. A process for synthesizing hydrocarbons which comprises alkylating an isoparaffin with an olefin in the presence of a metal halide catalyst and a hydrogen halide.

10. A process for synthesizing hydrocarbons which comprises alkylating isobutane with an olefin in the presence of a metal halide catalyst and a hydrogen halide.

11. A process for producing hydrocarbons boiling in the gasoline range which comprises alkylating isobutane with a normally gaseous olefin in the presence of a metal halide catalyst and a hydrogen halide.

12. A process for synthesizing hydrocarbons which comprises alkylating a paraffin with an olefin in the presence of aluminum chloride and hydrogen chloride.

13. A process for synthesizing hydrocarbons which comprises alkylating an isoparaffin with an olefin in the presence of aluminum chloride and hydrogen chloride.

14. A process for synthesizing hydrocarbons which comprises alkylating isobutane with an olefin in the presence of aluminum chloride and hydrogen chloride.

15. A process for producing hydrocarbons boiling in the gasoline range which comprises alkylating isobutane with a normally gaseous olefin in the presence of aluminum chloride and hydrogen chloride.

VLADIMIR N. IPATIEFF.
HERMAN PINES.